United States Patent [19]
Matsuo et al.

[11] Patent Number: 4,508,878
[45] Date of Patent: Apr. 2, 1985

[54] PROCESS FOR PRODUCING A BLOW MOLDING RESIN

[75] Inventors: Yoshiho Matsuo; Atsuhiko Yoshino; Ryoji Nishijima, all of Ichihara, Japan

[73] Assignees: Nissan Chemical Industries Ltd; Nissan Maruzen Polyethylene Company, both of Tokyo, Japan

[21] Appl. No.: 530,248

[22] Filed: Sep. 8, 1983

[30] Foreign Application Priority Data

Jul. 14, 1983 [JP] Japan ................................ 58-128523

[51] Int. Cl.³ ............................................ C08F 236/00
[52] U.S. Cl. .................................. 525/333.8; 525/387; 525/388
[58] Field of Search ...................... 525/333.8, 387, 388

[56] References Cited

U.S. PATENT DOCUMENTS

| 3,098,831 | 7/1963 | Carr | 525/333.8 |
| 3,211,804 | 10/1965 | Baum et al. | 525/333.8 |
| 3,234,197 | 2/1966 | Baum | 525/333.8 |
| 3,240,727 | 3/1966 | Scalari et al. | 525/333.8 |
| 3,567,697 | 3/1971 | Bates et al. | 525/333.8 |
| 3,631,161 | 12/1971 | Fan et al. | 525/333.8 |
| 3,756,999 | 9/1973 | Stetter et al. | 525/333.8 |
| 4,006,283 | 2/1977 | MacKenzie, Jr. et al. | 525/333.8 |
| 4,035,322 | 7/1977 | Tate et al. | 525/333.8 |

Primary Examiner—Morton Foelak
Attorney, Agent, or Firm—Oblon, Fisher, Spivak, McClelland & Maier

[57] ABSTRACT

A process for producing a blow molding resin comprises pelletizing a high density polyethylene prepared by means of highly active Ziegler catalyst, characterized in that a small amount of a cross linking agent is added to the high density polyethylene and the pelletizing is conducted in an atmosphere containing a small amount of oxygen.

3 Claims, No Drawings

PROCESS FOR PRODUCING A BLOW MOLDING RESIN

The present invention relates to a process for producing a blow molding resin. More particularly, the present invention relates to a process for producing a blow molding resin made of high density polyethylene and having good qualities such as superior surface appearance and processability particularly flash-trimmability during the molding operation.

Heretofore, Ziegler-type catalysts have been developed to increase their catalytic activities for the production of a high density polyethylene and thereby to improve the economy of its production and the quality such as mechanical strength of the product. However, these improvements of the catalysts have been directed to narrow the molecular weight distribution of the high density polyethylene. The narrow molecular weight distribution is not desirable for a blow molding resin, since it brings about some disadvantages such that at the time of the blow molding operation, "the die swell property will be small", "the draw down property will be poor" and "the shearing heat generation within the screw will be great".

Under the circumstances, there have been a number of proposals for improvements. For example, as an improvement of the reaction process, a two-stage polymerization or a multi-stage polymerization has been used to broaden the molecular weight distribution (Japanese Unexamined Patent Publication No. 146,885/1979). However, the polyethylene product thereby obtained does not adequately satisfy the various requirements for a blow molding resin. Namely, while being superior in the mechanical strength of the molded product (i.e. drop impact strength, top load strength, environmental stress cracking resistance, etc.), the high density polyethylene obtained by the multi-stage polymerization by means of highly active catalysts (i.e. catalytic activity of at least 10 kgPE/g.cat.) had drawbacks such that the shearing heat generation during the blow molding operation is great, the draw down property and the flash-trimmability are poor, and the surface appearance of the molded product is inferior.

As an improvement of this process, it has been proposed to conduct the blow molding by adding from 0.001 to 0.1% by weight of a cross linking agent to the polyethylene, whereby it is possible to increase the melt tension of the polyethylene and improve the draw down property without impairing the extrusion property and thus to conduct the blow molding operation in a good condition (Japanese Unexamined Patent Publication No. 212,029/1982). Further, a method has been proposed in which a compound comprising a high or medium density polyethylene having a high molecular weight and a high or medium density polyethylene having a low molecular weight, are slightly cross linked in the presence of from 0.001 to 0.1% by weight of a cross linking agent at a temperature of from 150° to 290° C. in a nitrogen atmosphere to obtain a composition wherein the polyethylenes are intimately melt-mixed (Japanese Unexamined Patent Publication No. 29,841/1983). This compound is described to have features such that it has a high rigidity, high environmental stress cracking resistance, and high impact strength, and further the melt-tension and die swell property are improved.

In each of the above-mentioned processes, it has been attempted to improve some properties of a high density polyethylene by using a cross linking agent. It is indicated that the drawbacks such that the die swell property is small and the draw down property is poor, can be overcome by these processes, but there is no indication for the improvement of the flash-trimmability intended by the present invention. Moreover, if the amount of the cross linking agent is increased to increase the effectiveness for the improvement, other drawbacks are likely to be led, such as undesirable odor or coloring due to the decomposition of the cross linking agent, whereby the commercial value of the products will be considerably impaired.

Further, as an improved process from another point of view, there has been proposed a process wherein a high density polyethylene prepared by means of a highly active Ziegler catalyst, is pelletized with an addition of at most 0.1 phr of a stabilizer at a temperature of at least 230° C. in an atmosphere containing from 0.5 to 21% by volume of oxygen, whereby the blow molding property and the surface appearance and the flash-trimmability of the molded products are improved (Japanese Patent Application No. 40,027/1983). According to this process, the shearing heat generation during the blow molding operation can be lowered to improve the processability, the flash-trimmability and the surface appearance of the molded product. However, no adequate improvement is obtainable with respect to the die swell property or draw down property during the blow molding operation. Namely, the product pelletized in an atmosphere containing 5% by volume of oxygen without using a cross linking agent, does not have an adequate die swell property and its draw down property is not yet adequate (see Comparative Example 9 in Table 1 given hereinafter). Under the circumstances, it has been desired to improve the die swell properties and draw down properties simultaneously with the improvement of the processability and the surface appearance.

The present inventors have found that by adding a small amount of a cross linking agent at the time of pelletizing the high density polyethylene prepared by means of a highly active Ziegler catalyst and conducting the pelletizing in an atmosphere containing a small amount of oxygen, it is possible to obtain a blow molding resin having excellent blow molding properties such as good die swell properties and draw down properties as well as practically excellent flash-trimmability and capable of providing a molded product having good quality with respect to the odor, the color, the surface appearance, etc.

As the cross linking agents to be used in the present invention, there may be mentioned 1,1-bis(t-butylperoxy)-3,3,5-trimethyl cyclohexane, 1,1-bis(t-butylperoxy)cyclohexane, 2,2-bis(t-butylperoxy) octane, n-butyl-4,4-bis(t-butylperoxy)valerate, di-t-butylperoxide, t-butylcumylperoxide, dicumylperoxide, $\alpha,\alpha'$-bis(t-butylperoxyisopropyl) benzene, 2,5-dimethyl-2,5-di(t-butylperoxy)hexane, 2,5-dimethyl-2,5-di(t-butylperoxy)hexyne-3, cumylperoxy neodecanoate, 2,5-dimethyl-2,5-di(benzoylperoxy)hexane, and t-butylperoxyisopropylcarbonate. These agents may be used alone or in combination as a mixture of two or more. Among these, a cross linking agent having a decomposition temperature of about 200° C. at a half-life period of 1 minute is most preferable.

The amount of the cross linking agent to be added to the high density polyethylene is preferably within a range of from 0.001 to 0.01 phr. If the amount is less than 0.001 phr, a moderate crosslinking effect intended by the present invention is not obtainable. On the other hand, if the amount exceeds 0.01 phr, the degree of cross-linking tends to be too high, whereby it is likely that gels appear or the processability tends to be inferior, or an odor or coloring will likely be imparted to the products due to the decomposition of the cross linking agent, such being practically undesirable.

In respect to the manner of incorporation of the cross linking agent, there is no particular restriction so long as the cross linking agent is uniformly dispersed for the reaction. For instance, there may be mentioned:

(1) A method wherein the cross linking agent is reacted to the high density polyethylene powder by means of a kneader such as a single screw extruder, a twin extruder or a Banbury mixer, followed by pelletizing; or (2) A method wherein a powder master batch containing plenty of the cross linking agent is preliminarily prepared, and this master batch is blended with the high density polyethylene powder, and then the cross-linking reaction is conducted in the same manner as the above mentioned (1) followed by pelletizing.

The oxygen concentration in the atmosphere is preferably from 0.5 to 10% by volume. Namely, in order to attain the intended processability, flash-trimmability and product quality with the cross linking agent added within a range of from 0.001 to 0.01 phr, no adequate effectiveness will be obtained at an oxygen concentration of less than 0.5% by volume. On the other hand, if the oxygen concentration exceeds 10% by volume, the effectiveness of the cross linking agent for the improvement of the physical properties of the resin intended by the present invention will be suppressed, whereby it will be impossible to attain the object for the distinct improvements of the molding processability, the flash-trimmability and the surface appearance, and it is likely that the physical properties of the resin will be inferior and the surface appearance will be poor. Namely, the feature of the present invention resides in that in the improvement of the blow molding processabilities of the high density polyethylene prepared by means of a highly active Ziegler catalyst, a cross linking agent in a small amount as small as from 0.001 to 0.01 phr and oxygen in an amount of from 0.5 to 10% by volume are employed in combination, whereby the blow molding processability and the flash-trimmability as well as the product quality such as the surface appearance, the odor and the color are totally improved without impairing the physical properties of the resin by the synergistic effects of the combination.

Now, the present invention will be described in further detail with reference to Examples and Comparative Examples. The methods for evaluating the properties of the molded products employed in the Examples and Comparative Examples were as follows.

The surface appearance of the molded products was determined by observation with naked eyes and the results were rated in accordance with the following standards:

Excellent: Extremely good with a fine sharkskin without flow marks.
Good: The sharkskin is slightly rough, but no flow marks were observed.
Bad: No good with a rough sharkskin and flow marks.

The flash-trimmability was represented by a torque value at the time when the upper flash of a 650 ml detergent bottle was removed by twisting it. The flash-trimmability is good if the torque value is at most 25 kg-cm.

With respect to the coloring of the resin, the Hunter bL-value was measured by a automatic color difference meter (manufactured by Suga Shikenki).

The odor was determined by the sense of smelling of the person who conducted the molding operation, in accordance with the following evaluation standards:
Excellent: Substantially odorless
Good: Slightly odorous, but still acceptable
Bad: The odor is too strong to be practically useful.

The die swell property as a blow molding processability was determined by extruding a parison of 60 cm from a predetermined die gap by means of a DA-75 model blow molding machine (manufactured by PLACO) and represented by the weight of the parison.

The draw down property was determined by extruding a parison of 60 cm from a die and then permitting the parison to suspend from the die, whereby the time (seconds) required for the parison to elongate to a length of 80 cm was taken.

EXAMPLE 1

Effect of the concentration of the cross linking agent (Test Nos. 2, 4, 5, 9 and 10 in Table 1)

The concentration of the cross linking agent was varied from 0 to 0.02 phr at an oxygen concentration of 5% by volume.

In the system wherein no cross linking agent was added, the die swell property and draw down property during the blow molding operation were inadequate although the surface appearance, the flash-trimmability, the coloring and the odor were good. On the other hand, in the system where 0.020 phr of the cross linking agent was added, the surface appearance, the color and the odor were inferior although the flash-trimmability, the die swell property and the draw down property were improved. Whereas, in the systems where the cross linking agent was added in an amount of from 0.002 to 0.010 phr, not only the surface appearance, the flash-trimmability, the color and the odor were improved, but also the die swell property and the draw down property during the blow molding operation were improved.

EXAMPLE 2

Effect of the concentration of oxygen (Test Nos. 1, 2, 3, 7 and 8 in Table 1)

The oxygen concentration was varied from 0 to 15% by volume at a cross linking agent concentration of 0.007 phr.

At the oxygen concentration of 0% by volume, the surface appearance and the flash-trimmability were inferior, whereby the object of the present invention could not be attained. On the other hand, when the oxygen concentration was 15% by volume, the surface appearance and the color were inferior although the flash-trimmability was improved. Whereas, when the oxygen concentration was from 1 to 8% by volume at a cross linking agent concentration of 0.007 phr, not only the surface appearance, the flash-trimmability, the color and the odor, but also the die swell property and the draw down property during the blow molding operation, were improved.

EXAMPLE 3

Effect of the type of the cross linking agent (Test Nos. 2 and 6 in Table 1)

In each of cases where cross linking agents A and B were used, the surface appearance, the flash-trimmability, the color and the odor were excellent, and at the same time, the die swell property and the draw down property during the blow molding operation were improved.

relative to the high density polyethylene, and the pelletizing is conducted in an atmosphere having an oxygen concentration within the range of from 0.5 to 10% by volume.

2. The process according to claim 1, wherein said cross-linking agent is 1,1-bis(t-butylperoxy)-3,3,5-trimethylcyclohexane, 1,1-bis(t-butylperoxy)cyclohexane, 2,2-bis(t-butylperoxy)octane, n-butyl-4,4-bis(t-butylperoxy)valerate, di-t-butylperoxide, t-butylcumylperoxide, dicumylperoxide, $\alpha,\alpha'$-bis(t-butylperoxyisopropyl)benzene, 2,5-dimethyl-2,5-di(t-butylperoxy)hexane, 2,5-dimethyl-2,5-di(t-butylperoxy)hexyne-3-cumylperoxy neodecanoate, 2,5-dimethyl-2,5-di(benzoylperoxy)hexane and t-butylperoxyisopropylcarbonate.

3. The process according to claim 2, wherein said crosslinking agent has a decomposition temperature of about 200° C. at a half-life period of one minute.

| Conditions | Test No. | Pelletizing conditions ||| Properties of molded products |||| Blow processability ||
|---|---|---|---|---|---|---|---|---|---|---|
| | | Crosslinking agent || Oxygen concentration (vol %) | Surface appearance | Flash-trimmability torque (kg-cm) | Color bL-value | Odor | Die swell property (g) | Draw down property (seconds) |
| | | Kind | Amount (phr) | | | | | | | |
| Present Invention | 1 | A | 0.007 | 1 | Excellent | 24 | 0.5 | Excellent | 1650 | 18 |
| | 2 | A | 0.007 | 5 | " | 20 | 0.5 | " | 1600 | 20 |
| | 3 | A | 0.007 | 8 | " | 18 | 0.5 | " | 1600 | 20 |
| | 4 | A | 0.002 | 5 | " | 24 | −0.5 | " | 1550 | 15 |
| | 5 | A | 0.010 | 5 | " | 18 | 1.0 | " | 1650 | 21 |
| | 6 | B | 0.007 | 5 | " | 22 | 0.5 | " | 1650 | 19 |
| Comparative Examples | 7 | A | 0.007 | 0 | Bad | 30 | 0.5 | " | 1650 | 18 |
| | 8 | A | 0.007 | 15 | " | 15 | 3.0 | " | 1550 | 22 |
| | 9 | A | 0 | 5 | Excellent | 23 | 0.0 | " | 1500 | 10 |
| | 10 | A | 0.020 | 5 | Bad | 18 | 5.0 | Bad | 1700 | 25 |

Radical forming agent A: $\alpha,\alpha'$-bis(t-butylperoxyisopropyl)benzene
Radical forming agent B: 2,5-dimethyl-2,5-di(t-butylperoxy)hexane

We claim:

1. A process for producing a blow molding resin which comprises pelletizing a high density polyethylene prepared by means of a highly active Ziegler catalyst, wherein a cross-linking agent is added to the high density polyethylene in an amount such that the concentration of the cross-linking agent is from 0.001 to 0.01 phr